United States Patent [19]

Schlessel

[11] Patent Number: 5,069,117

[45] Date of Patent: Dec. 3, 1991

[54] MULTI-PURPOSE POULTRY ROASTER AND BAKING RACK

[75] Inventor: Walter Schlessel, Hewlett Neck, N.Y.

[73] Assignee: Gemco Ware, Inc., Freeport, N.Y.

[21] Appl. No.: 609,582

[22] Filed: Nov. 6, 1990

[51] Int. Cl.⁵ ............................................. A47J 43/18
[52] U.S. Cl. .................................... 99/419; 99/425; 99/426; 99/446; 99/448; D7/409
[58] Field of Search ................. 99/419, 415, 425, 426, 99/444–446, 448, 449, 418; 211/181, 125; D7/409

[56] References Cited

U.S. PATENT DOCUMENTS

| | | | |
|---|---|---|---|
| D. 253,156 | 10/1979 | Bengloff | D7/409 |
| 691,833 | 1/1902 | Williamson | 99/426 |
| 3,363,544 | 1/1968 | Eriksen | 99/426 |
| 3,392,665 | 7/1968 | Harnest | 99/426 |
| 4,557,188 | 12/1985 | Spanek | 99/415 |
| 4,633,773 | 1/1987 | Jay | 99/446 |
| 4,709,626 | 12/1987 | Hamlyn | 99/449 |
| 4,848,217 | 7/1989 | Koziol | 99/419 |
| 4,924,768 | 5/1990 | Jay | 99/425 |

Primary Examiner—Timothy F. Simone
Attorney, Agent, or Firm—Lilling and Lilling

[57] ABSTRACT

A multi-purpose poultry roaster and baking rack which has a drip pan, and an assembly of wires which forms a plurality of upwardly directed generally vertically oriented skewers positioned about the periphery of the interior surface of the drip pan, and a centrally located upstanding prong formed of the middle portions of the wire assembly, so that poultry or other similar foods can be roated on the inner prong, while potatoes, or apples, or other similar items can be baked on the skewers located about the periphery of the interior surface of the drip pan. The wire assembly is held together by interlocking notch and apex portions of the wire, and held to the drip pan by additional wires affixed to the assembly of wires, and curved to align with holes located about the periphery of the drip pan.

7 Claims, 3 Drawing Sheets

MULTI-PURPOSE POULTRY ROASTER AND BAKING RACK

BACKGROUND OF THE INVENTION

1. Field of the Invention

The invention generally relates to baking and roasting utensils, and, more specifically, to a multipurpose baking and roasting rack.

2. Description of the Related Art

Numerous designs have been proposed for supports or racks for roasting poultry and other items in a conventional oven The various supports or racks center around two themes. The first is to have a centrally located upstanding member which can be used to support poultry for roasting in a conventional oven. These designs typically utilize a number of substantially closed wire loops which cooperate with each other to define a hollow bulbous shaped member which protrudes upwardly from a drip pan or cooking tray. One of the advantages of this type of rack is that heat is evenly distributed throughout the bird being roasted and its fat and grease are permitted to drip directly into the pan.

U.S. Pat. No. 4,633,773, issued to the Assignee of the subject application, discloses such a holder which includes two bent wire interlocking elements, the free ends of which are attached to the peripheral rim of the drip pan. Each of the two cooperating bent wires form a centrally upward extending loop which are suitable for insertion into the cavity of the poultry to be roasted.

Other roasting supports of this type are disclosed in U.S. Pat. No. 3,392,665, and racks designed without drip pans are shown in U.S. Design Pat. Nos. 253,156 and 270,608.

A disadvantage of these racks is that their use is limited by the fact that the centrally upstanding member is suitable for few uses other than roasting poultry.

Other racks have been disclosed for cooking foods, such as potatoes or artichokes. In these types of racks, the rack is typically formed of a pair of wires which are bent and closed on each other so as to form a cradle for an item of food which can be received or nested on the rack. Such a rack is disclosed in U.S. Pat. No. 4,557,188.

U.S. Pat. No. 4,924,768, issued to the Assignee of the subject application, discloses a multi-purpose rack which is suitable both for baking and roasting. This rack discloses a plurality of generally vertically oriented skewer rods positioned above a drip pan, each adapted to pierce and support a food item to be baked or roasted. An advantage to this device is that it allows numerous items to be cooked at the same time. With the racks of previous design, only a single bird could be roasted per rack. The rack disclosed in U.S. Pat. No. 4,924,768, however, allows numerous items such as potatoes or apples to be baked at the same time using one rack. A disadvantage to this rack is that the central space of the rack is not efficiently utilized. When the rack is assembled for use, and items to be baked are placed upon the skewers, the central space is left open.

SUMMARY OF THE INVENTION

Accordingly, it is an object of the present invention to provide a multi-purpose rack which is suitable both for roasting poultry and baking other items and which more efficiently utilizes the space available for baking or roasting foods above the drip pan.

The present invention thus provides a rack which can be used to bake and roast a single large item of food, such as a chicken, and a plurality of smaller items of food, such as potatoes, apples, and the like, at the same time.

The present invention also has the object of providing a rack of the type aforementioned which can be easily disassembled and collapsed for cleaning and storage, and is stable during use.

A further object of the present invention is to provide a multi-purpose rack which is simple in construction and economical to manufacture.

Another object of the present invention is to provide a multi-purpose rack as described which is suitable for low fat cooking of items such as poultry, and yet seals in juices and eliminates fats during roasting.

In order to achieve the above objects, as well as others which will become apparent hereafter, a multi-purpose baking and roasting rack in accordance with the present invention comprises a drip pan having a raised peripheral rim circumferentially extending about a downwardly recessed interior surface. Wires are affixed to this pan so as to form a central upstanding member which is suitable for roasting poultry and other items, surrounded by a plurality of skewer rods positioned above the recessed interior surface of the drip pan. The wires are constructed so as to be removable from the pan and to be stable which attached to the pan.

According to one preferred embodiment, a first wire is bent so that its two ends are upstanding skewers. The wires proceeds in a generally vertical direction towards the pan, from the skewers, then bends into a generally horizontal plane curving inwards, towards the center of the pan, then bends upwardly in a substantially vertical direction to a desired height, where the wire then bends downwardly and towards the center, to meet in the center forming a notch. The upper portion of this wire results in a shape which is sinusoidal in nature. A second wire also has both ends serving as skewers. These ends which serve as skewers proceed downwardly towards the pan in a substantially vertical direction, then bend inwardly towards the center of the pan in a substantially horizontal direction, then bend upwardly in a substantially vertical direction, where the wires bend towards the center to form an apex which fits into the notch of the first wire. At the first bend of each end of each wire, an affixing wire is attached which is substantially horizontal and which curves downwardly for attachment to the drip pan.

These wires fit together and can be affixed to the pan so that a central upstanding member is formed which can be used for roasting poultry, while a plurality of skewers about the outer portion of the pan are also formed for roasting or baking other items such as potatoes or apples.

BRIEF DESCRIPTION OF THE DRAWINGS

The foregoing and other important objects of the present invention will become more apparent during the following disclosure which will be made by reference to the drawings, in which.

DESCRIPTION OF THE PREFERRED EMBODIMENTS

Figure 1:
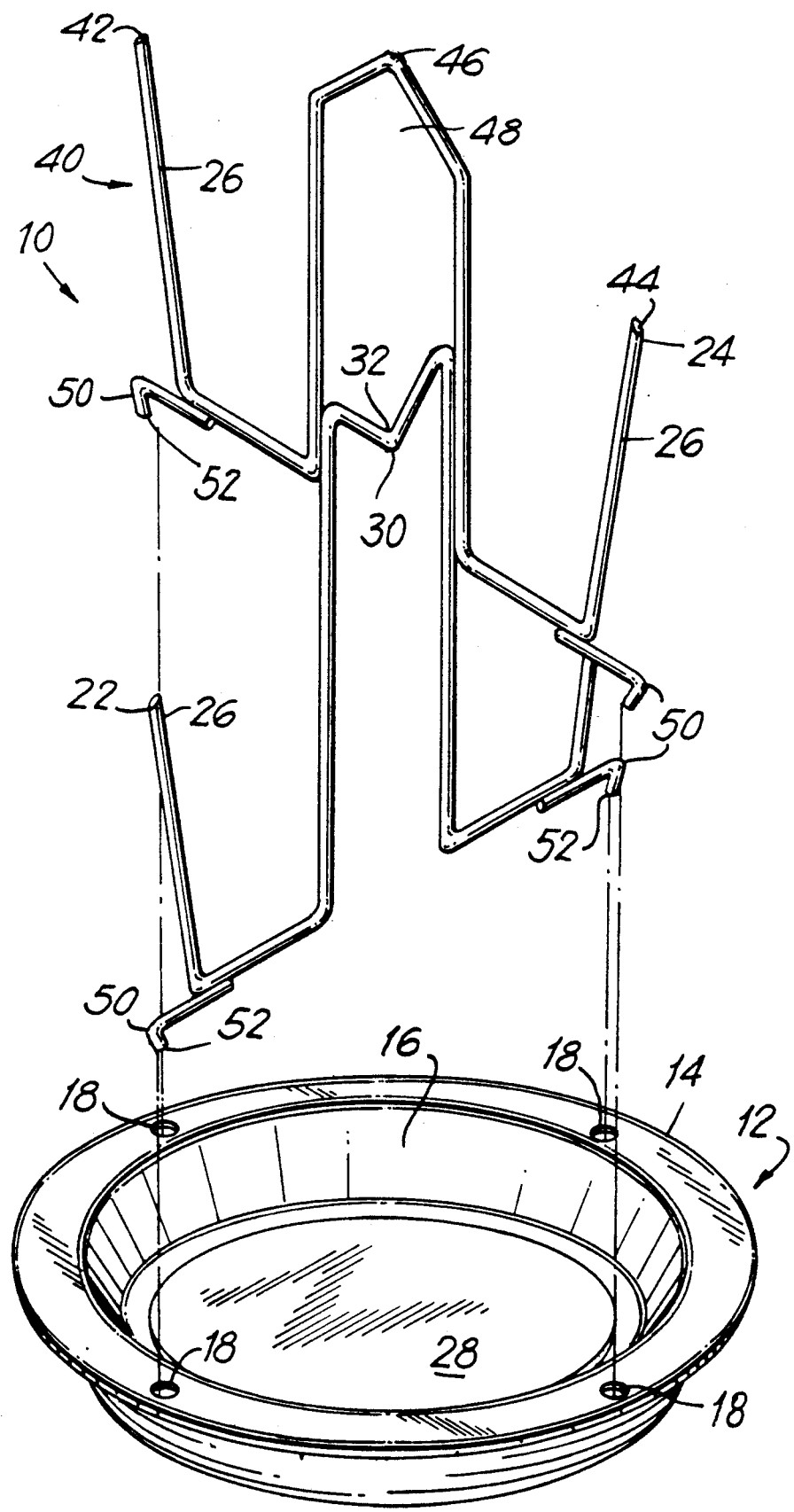
FIG. 1 is an exploded view of the baking and roasting rack in accordance with the present invention.
Figure 2:
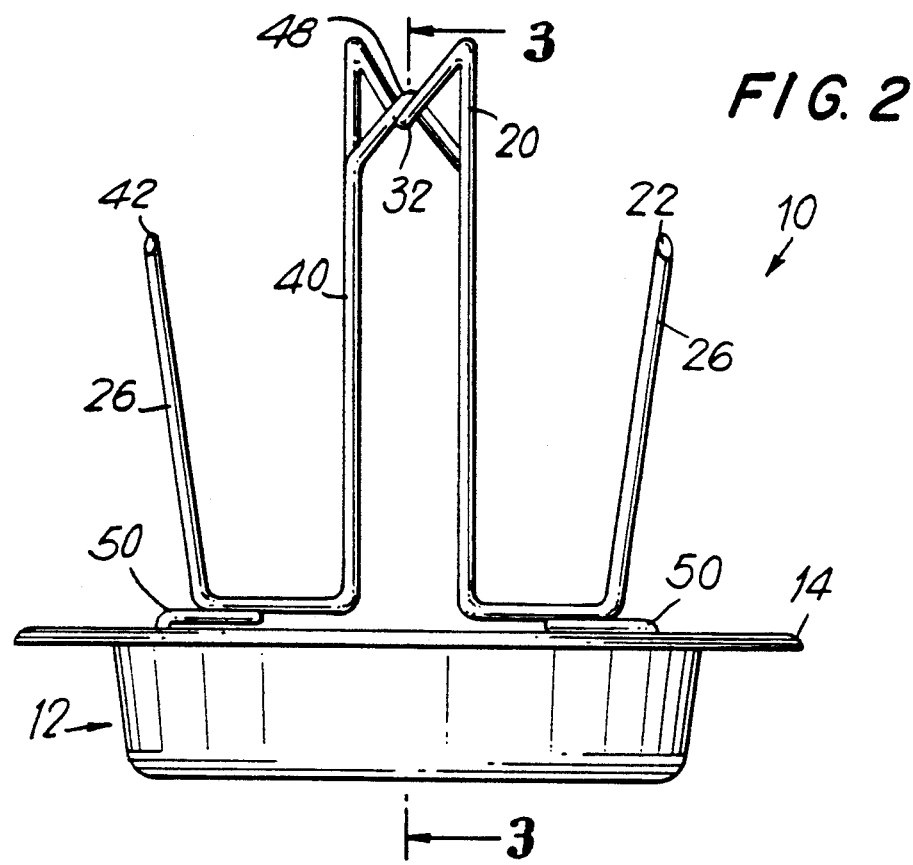
FIG. 2 is a side view of the multi-purpose baking and roasting rack, shown assembled and ready to use.
Figure 3:
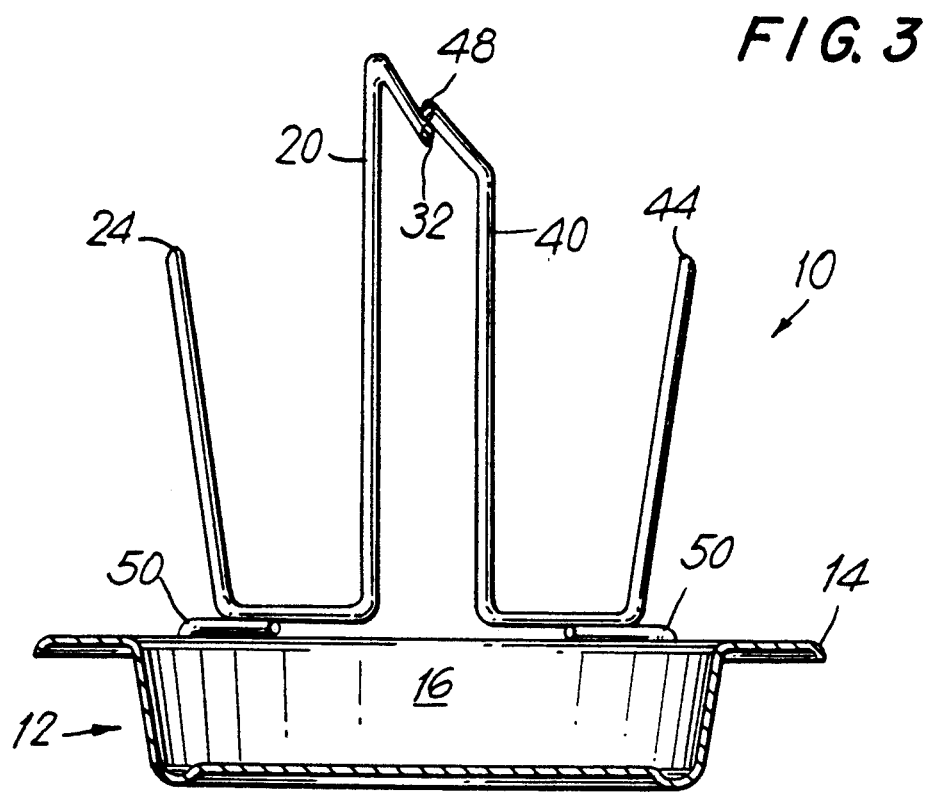
FIG. 3 is a side elevational view taken along the line 3—3 shown in FIG. 2.

Referring now specifically to the figures, in which identical or similar parts are designated by the same reference numerals throughout, and first referring to FIG. 1, a multi-purpose baking and roasting rack in accordance with the present invention is generally designated by the reference numeral 10.

The rack includes a drip pan 12 having a raised peripheral rim 14 circumferentially extended about a downwardly recessed interior surface 16. The peripheral rim 14 is provided with a plurality of holes 18 which are spaced from each other about the peripheral rim 14. In a preferred embodiment, four holes 18 are disposed about the peripheral rim and are substantially uniformly spaced from each other, although as will become evident from the disclosure that follows, it is possible to utilize more or less holes, limited only by the ability to stabilize the unit as will become more fully apparent hereafter.

The rack further includes a first wire 20. This first wire 20 has two ends 22, 24 which serve as two of a plurality of substantially vertical skewers 26 to be placed about the outer portion of the interior surface 16 of the drip pan 12. The first wire 20 is bent in a vertical plane so that the ends 22, 24 proceed downwards towards the pan in a substantially vertical direction, and then curve inwardly in a substantially horizontal direction towards the center 28 of the interior surface 16 of the drip pan 12. The wire then curves upwardly in a substantially vertical direction, still in the same vertical plane, to a desired height. At the desired height, the wire bends inwardly and downwardly to meet in the middle 30 of the wire forming a notch 32 in the middle 30 of the first wire 20. The upper portion of the first wire 20 is therefore sinusoidal in shape. A second wire 40 also has two ends 42, 44 which serve as two of the plurality of skewers 26. The ends 42, 44 of the second wire 40 curves downwards in a substantially vertical direction towards the drip pan 12. The second wire 40 then curves inwardly towards the center 28 of the pan 12, in a substantially horizontal direction. The second wire 40 then curves upwardly in a substantially vertical direction, until it reaches a desired height. The wire then curves inwardly to meet at the middle 46 of the second wire to form an apex 48 which, when the rack is assembled, coincides with the notch 32 of the first wire 20 to stabilize the assembled rack.

To further stabilize the rack, each wire is provided with means 50 for attaching the wire to the pan.

In the preferred embodiment, the attaching means 50 are wire portions which are affixed to the first wire 20 and the second wire 40 at the portion of each wire which curves in the horizontal plane. The attaching means are wires which also curve in the horizontal plane at the point where they are attached to the first wire 20 and the second wire 40, and which then curve downwardly in a substantially vertical direction so as to align with the holes 18 of the drip pan 12. The downwardly directed vertical portions 52 of the attaching means 50 can be curved inwardly towards the center 28 of the drip pan 12 at an angle of, for example, 15 degrees from the vertical, so as to provide better stability for the rack 10 when it is assembled.

The attaching means 50 which are affixed to the first wire 20 and the second wire 40, can be affixed by any practical means, such as by welding.

The rack is assembled by placing the first wire upon the drip pan 12, so that the attaching means 50 of the first wire 20 align with two opposing holes 18 of the drip pan 12. The second wire 40 is then positioned on top of the first wire 20, so that the attaching means 50 of the second wire 40 align with the two remaining opposing holes 18 of the drip pan 12. In this configuration, the apex 48 located in the middle 46 of the second wire 40 aligns with the notch 32 located in the middle 30 of the first wire 20 to lock and stabilize the wires in their position for use.

In the embodiment where the downwardly directed vertical portions 52 of the attaching means 50 are curved inwardly at, for example, a 15 degree angle from the vertical, the rack will be more stable when assembled.

Figure 4:
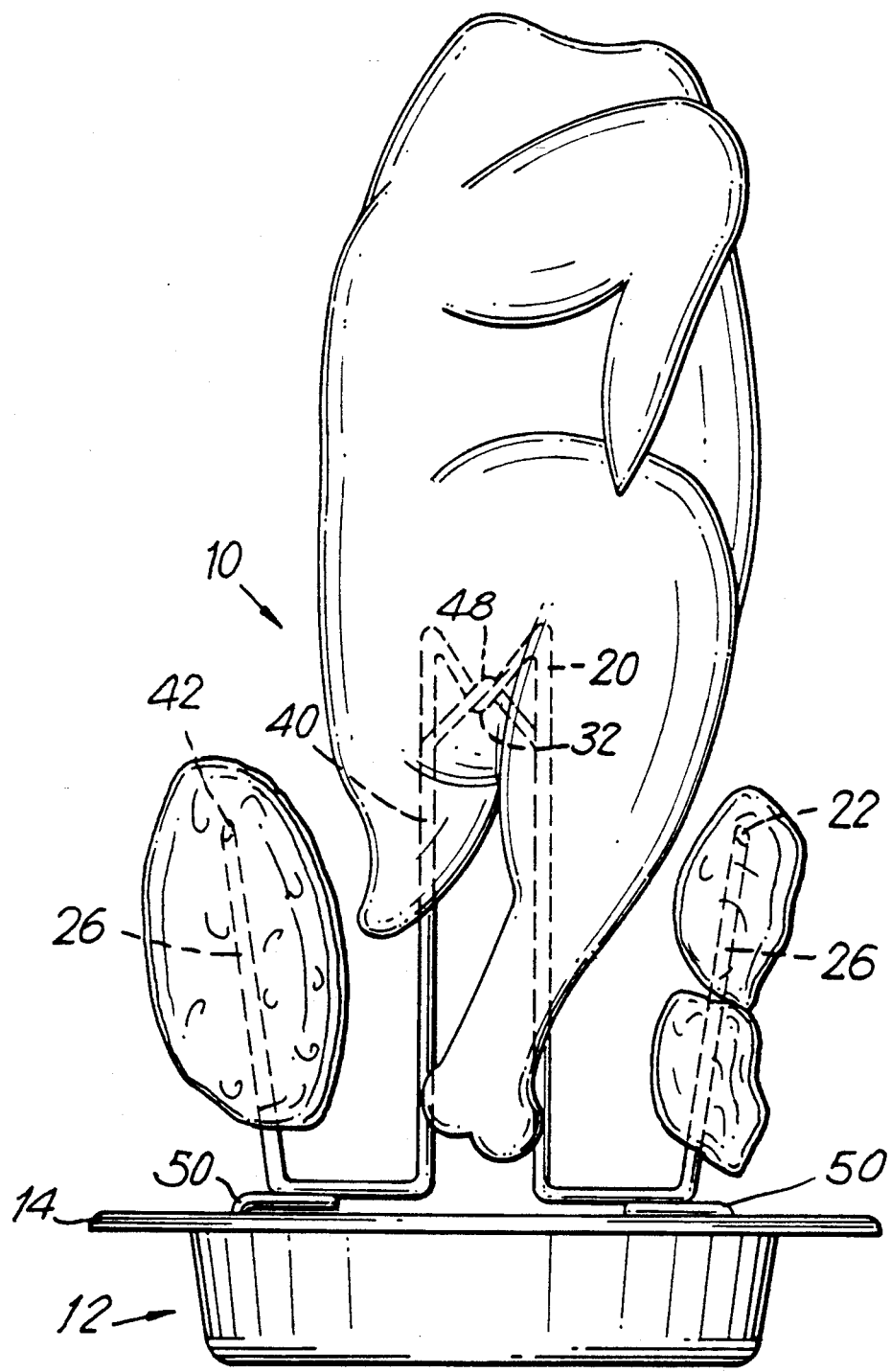
FIG. 4 is a side elevational view of a multi-purpose baking and roasting rack in accordance with the present invention, showing a chicken and other items ready to be roasted.

The above described bending of the wire elements 20, 40 is preferred because the resulting vertical portions of the wire elements 20, 40 are positioned in close proximity to each other, as illustrated in FIG. 4, for ease in insertion of the wire elements into a poultry cavity while resulting in acceptable rigidity of the assembly. The specific bending of each wire results, also, in an embodiment in which fluids will travel straight down from the roasting poultry and into the drip pan 12, minimizing splashing of the dripping fluids into the oven. It must be appreciated, however, that the wire elements 20, 40 could be bent in any manner in the first curve from the ends 22, 24 or 42, 44 towards the center 28 of the pan 12, which does not create a barrier to inserting the central portion of the rack 10 into a cavity of the poultry to be roasted.

It is apparent that more than two wires could be assembled in this manner, so as to provide a larger number of skewers 26 around the outer portion of the interior surface 16 of the drip pan. In this case, there would be a matching number of holes 18 located in the rim 14 of the drip pan 12.

Advantageously, the upper surface of the drip pan 12 is coated with a non-stick easy to clean finish. Such coating, which must be heat-resistant, may be any one of a number of different known synthetic resins, such as a resin marketed by Dupont under the trademark "TEFLON" or a resin marketed by General Electric under the tradename "POLYCARBONATE". To facilitate piercing of the food to be mounted on the skewers 26 located about the periphery of the interior surface 16, the skewers are advantageously tapered at the upper ends.

It should be noted that the size and shape of the drip pan 12 is not critical. Likewise, the wire assembly can be made using first wires 20 and second wires 40 of any desirable size to facilitate the roasting of various sizes of birds and other items to be cooked on the skewers 26.

When the rack is no longer in use, the wire elements 20, 40 are detachably mounted on the drip pan 12 to permit the rack to be disassembled and collapsed. This is done by simply urging the vertical portions 52 of the attaching means 50 from their associated holes 18. This may require an upward and outward force applied to the attaching means 50 in order to flex the same, and, in essence, increase the separation between the opposing vertical portions 52. Once disassembled, the first and second wires, each being planar in nature, can be efficiently stored or packaged. Disassembling the rack also greatly facilitates the cleaning of the rack once the cooking is finished.

It should be noted that the skewers 26 as described above are generally equally spaced about the periphery of the interior surface 16 of the drip pan 12. To insure that items baked or roasted on the skewers 26 are located above the interior surface 16 of the drip pan 12, the attaching means 50 must be of a suffiicent length so that the skewers 26 are positioned above the interior surface 16 of the drip pan 12. This assures that any drippings of fat or grease from items roasted on the skewers 26 are also collected within the drip pan 12.

While preferred embodiments in accordance with the invention have been illustrated and described, it is understood that various modifications may be resorted to without departing from the scope of the appended claims.

I claim:

1. A multi-purpose baking and roasting rack, comprising:
   a detachable drip pan having a raised peripheral rim circumferentially extending about a downwardly recessed interior surface, and a center;
   a first wire element, having two upstanding ends, said first wire element curving downward from said ends of said first wire element in a substantially vertical direction, then bending in a substantially horizontal direction towards said center of said drip pan to form a lower horizontal portion, then bending upwards in a substantially vertical direction, and then bending inwards towards said center of said drip pan to meet at a middle point of said first wire element;
   a second wire element, having two upstanding ends, said second wire element curving downward from said ends of said second wire element in a substantially vertical direction, then bending in a susbstantially horizontal direction towards said center of said drip pan to form a lower horizontal portion, then bending upwards in a substantially vertical direction, and then bending inwards towards said center of said drip pan to meet at a middle point of said second wire element;
   means for removably affixing said first wire element and said second wire element to said drip pan; and
   means for stabilizing said first wire element and said second wire element.

2. A multi-purpose baking and roasting rack as claimed in claim 1, wherein said means for removably affixing said first wire element and said second wire element to said drip pan comprises a plurality of affixing wire elements, attached to said lower horizontal portions of said first wire element and said second wire element, each of said affixing wire elements comprising a substantially horizontal member affixed to said lower horizontal portion of said first and second wire elements, and a substantially vertical member, curving downwards in a substantially vertical direction to align with holes located about said peripheral rim of said drip pan.

3. A multi-purpose baking and roasting rack as claimed in claim 2, wherein each said substantially vertical portion of said affixing wire element curves towards said center of said pan at an angle of 15 degrees to a vertical axis.

4. A multi-purpose baking and roasting rack as claimed in claim 1, wherein said means for stabilizing said first and second wire elements comprises:
   a first upper portion of said first wire element, located at said middle point of said first wire element, said first upper portion being bent to form a notch; and
   a second upper portion of said second wire element, located at said middle point of said second wire element, said second upper portion being bent to form an apex, so that when said rack is assembled, said notch of said first wire element interlocks with said apex of said second wire element to give said rack stability.

5. A multi-purpose baking and roasting rack as claimed in claim 2, wherein said means for stabilizing said first and second wire elements comprises:
   a first upper portion of said first wire element, located at said middle point of said first wire element, said first upper portion being bent to form a notch; and
   a second upper portion of said second wire element, located at said middle point of said second wire element, said second upper portion being bent to form an apex, so that when said rack is assembled, said notch of said first wire element interlocks with said apex of said second wire element to give said rack stability.

6. A multi-purpose baking and roasting rack as claimed in claim 3, wherein said means for stabilizing said first and second wire elements comprises:
   a first upper portion of said first wire element, located at said middle point of said first wire element, said first upper portion being bent to form a notch; and
   a second upper portion of said second wire element, located at said middle point of said second wire element, said second upper portion being bent to form an apex, so that when said rack is assembled, said notch of said first wire element interlocks with said apex of said second wire element to give said rack stability.

7. A multi-purpose baking and roasting rack as claimed in claim 6, wherein said interior surface of said drip pan is coated with a non-stick surface.

* * * * *